Feb. 8, 1955     E. SOUCZEK     2,701,853
PLURAL INPUT FOLLOW-UP SYSTEM
Filed Dec. 19, 1949     2 Sheets-Sheet 1
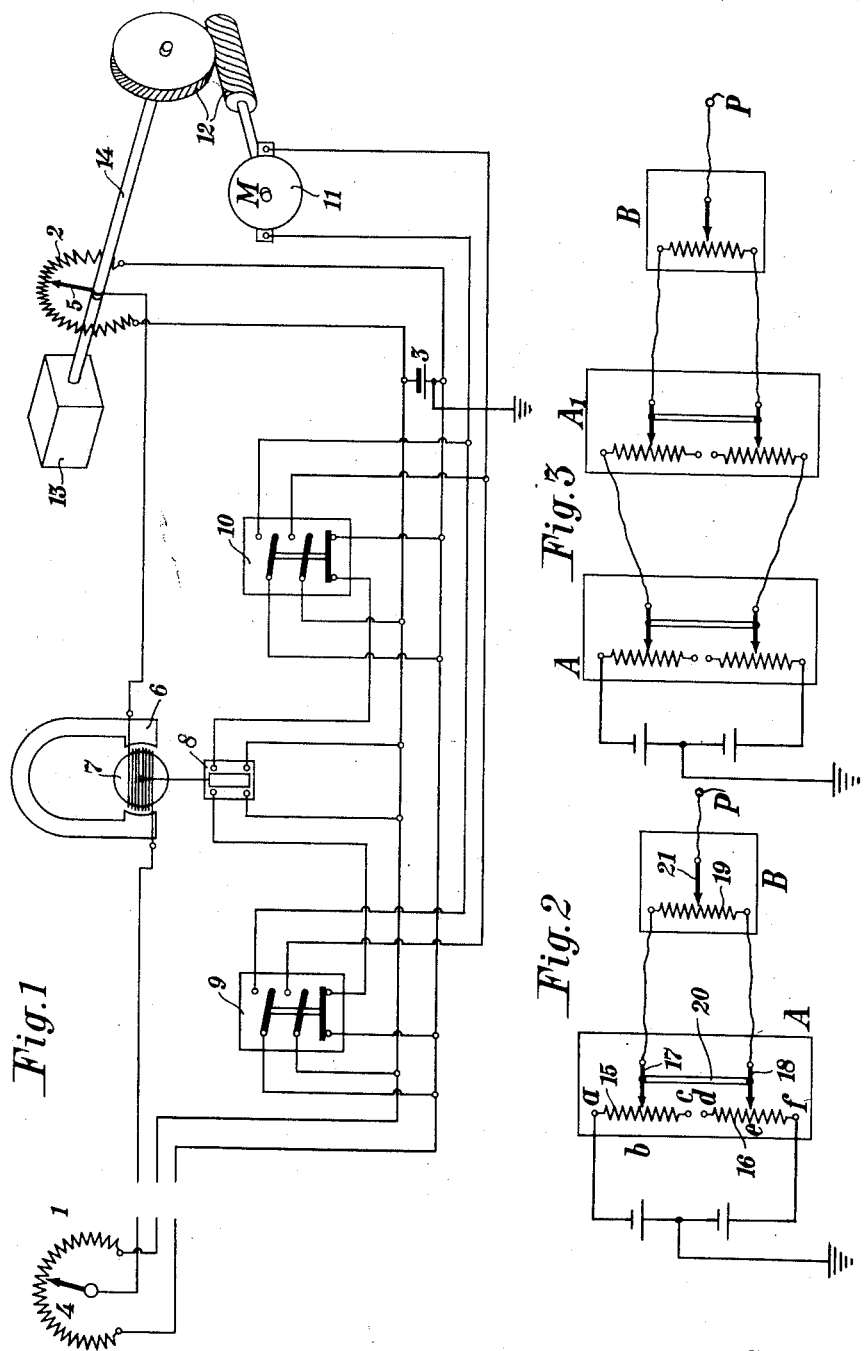
INVENTOR.
Ernst Souczek
BY
Attorney Feb. 8, 1955 E. SOUCZEK 2,701,853
PLURAL INPUT FOLLOW-UP SYSTEM
Filed Dec. 19, 1949 2 Sheets-Sheet 2
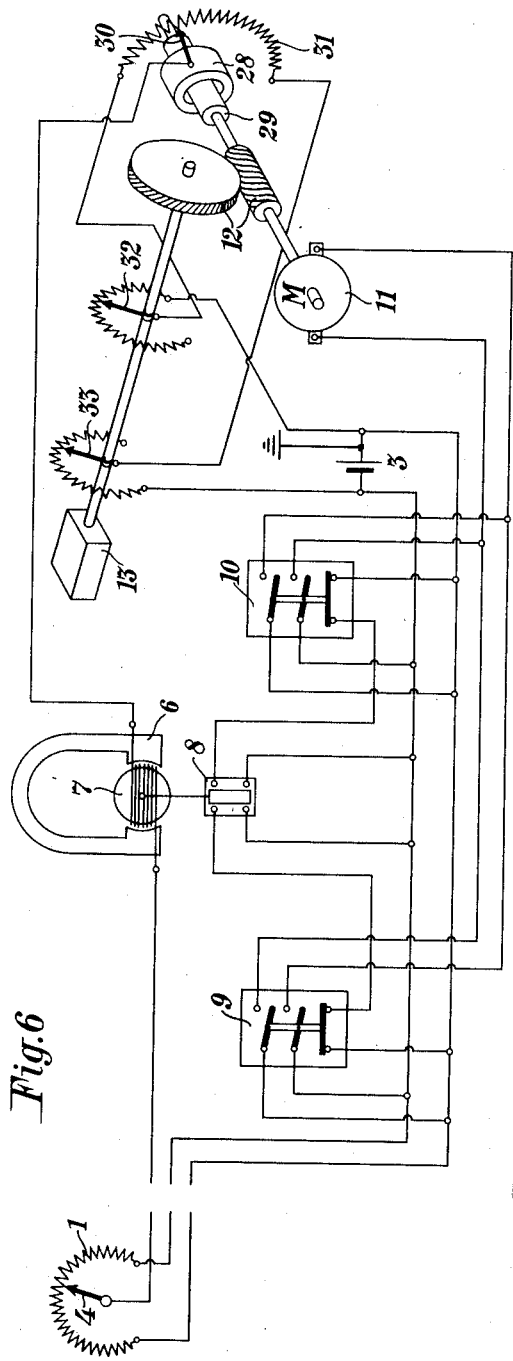
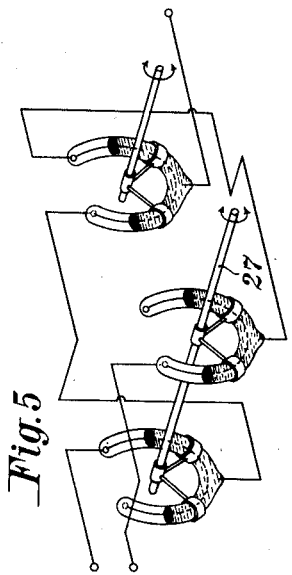
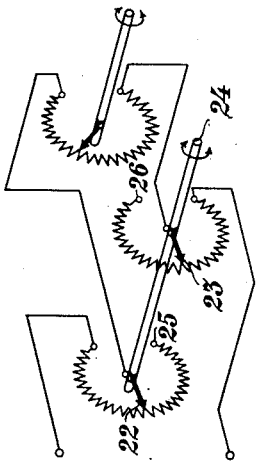
INVENTOR.
Ernst Souczek
BY

United States Patent Office 2,701,853
Patented Feb. 8, 1955

2,701,853

PLURAL INPUT FOLLOW-UP SYSTEM

Ernst Souczek, Vienna, Austria, assignor of one-half to Armin J. Herz, Chicago, Ill.; George P. Herz, administrator of Armin J. Herz, deceased Application December 19, 1949, Serial No. 133,728

Claims priority, application Austria December 24, 1948

4 Claims. (Cl. 318—29)

Devices are known for the electrical transmittal of measurement values which are provided with transmitter resistances connected as potentiometers. These known devices are either operatively connected directly with cross-coil measuring instruments, or are connected with another adjustable potentiometer, the receiver potentiometer, the tapping of which is adjustable at the indicating means.

It is also known to use a servo-motor for transforming the transmitted measurement values into control movements. For this purpose the control device is provided with transmitter and receiver potentiometers and with a polarized relay, which is connected in a bridge network and connects through additional relays the servo-motor, the latter performing the adjustment of the tapping of the receiver potentiometer.

In some cases it is desirable or necessary that the indicating or control means be subject to the influences of several measurement values, either for compensation of disturbing influences on the principal measurement value, or because the required measurement or control value is additively composed of several measurement values, which may be supplied from several transmitters. If, e. g., an air or marine craft, which approximately keeps a constant speed, is to make its course at a certain altitude, the elevator ought to be subject to the influences of at least two measurement values, viz., altitude and inclination of the craft. Similarly, when such a craft is to follow a prescribed course, two measurement values are required, viz., in general the deviation from the prescribed direction and the angular speed of the craft; these values to influence the rudder or the rudder operating machine.

The sum effect of several measurement values can be obtained in various ways. Most simply it is obtained mechanically over a sum lever. However, combinations of mechanical with either pneumatical or electro-hydraulical transmitting means are also in use.

This invention has the object of providing an indicating or control means which is subjected to the influences of several measurement values, independently from each other solely by electrical means on the basis of additive super-position. The object is achieved according to the invention in replacing the transmitter and/or the receiver-potentiometer, or both the transmitter and the receiver potentiometer are each replaced by a sum potentiometer which consists of an odd number of rheostats of which one is arranged singly and the remaining rheostats are arranged in pairs. The two rheostats of each pair are equal to each other, and only one end of each rheostat is connected to the circuit. Their tappings, which are adjustable in accordance with the measurement value to be transmitted, are positively connected with each other to move in unison so that the effective total resistance of each pair remains constant for any position of the pair of tappings. The rheostats of the first pair are connected to the voltage to be divided, whereas the rheostats of the subsequent pairs and the one remaining rheostat, which is connected as a potentiometer, are connected to the tappings preceding them.

Another object of this invention is to provide a remote-control device which comprises a servomotor for ensuring aperiodic control motion. Other objects of the invention relate to the design and arrangement of the rheostats forming the sum potentiometer.

In the drawing, embodiments of the invention are shown diagrammatically, by way of example.

Fig. 1 shows the wiring diagram of a known remote-control device;

Figs. 2 and 3 show wiring diagrams of two- and three-part sum potentiometers, respectively;

Figs. 4 and 5 show, diagrammatically, embodiments of two-part potentiometers;

Fig. 6 shows the wiring diagram of a remote-control device which comprises an additional device for compensating the inertia of the servomotor.

The sum potentiometer consists in its simplest form (Fig. 2) of the parts A and B. The part A is composed of two equal rheostats 15, 16 whose variable tappings 17, 18 are connected with each other, on the one hand conductively through the resistance 19 and on the other hand mechanically through the tie 20. Hence, the total of the current-carrying resistance parts a—b and e—f, and that of the currentless parts b—c and d—e, remain always the same during any adjustment of the tappings 17, 18. The rheostat 19, which comprises the tapping 21 and is constructed as a potentiometer, represents the part B of the sum potentiometer.

When such a sum potentiometer is placed into a remote-control device to replace a conventional simple transmitter potentiometer, the point P of the indicating or control means can be influenced independently from two places, namely by an adjustment of the tappings 21 caused by changes in one measurement value and by joint adjustments of the tappings 17, 18 due to changes of another measurement value; the simultaneous influences being additively superposed.

If it is desired that the indicating or control means may be subject to the influences of three measurement values, the circuit may take the form shown in Fig. 3 in which, as compared with Fig. 2, an additional part A₁, which is equal to the part A, is connected between parts A and B. On principle, n—1 parts A and one part B can be assembled to form an n-part sum potentiometer, where n equals the number of influences possible.

In remote-control devices which are provided with transmitter- and receiver-potentiometers, and in which an n-part sum potentiometer is used as the transmitter potentiometer and an m-part potentiometer as the receiver potentiometer, and in which one tapping only is coupled with the indicating means, the latter can be influenced by as many as (n m—1) measurement values.

A preferred embodiment of the sum potentiometer results when the parts consisting of two rheostats are composed each of two simple rheostats of the conventional type, with the resistance windings each arranged as a ring and having a rotary tapping (Fig. 4). The two-wiper contacts 22, 23 are fixed to a common shaft 24, or the shafts of the two potentiometers are coupled with each other, the total of the resistance values between the wiper contacts 22, 23 and between the currentless terminals 25, 26 being always equal to the resistance of a single rheostat.

Similarly the sum potentiometer may also consist of annular tubes which are half filled with mercury and into which a resistance wire is fused; their tappings are varied by the movement of the mercury charge which results when a tube is rotated in its plane. The two annular tubes of the part A must be so connected that their angle of deflection is the same; in Fig. 5 this is effected by a common shaft 27.

One of the many possibilities of application of the sum potentiometer according to the invention will now be described by way of example and with reference to Figs. 1 and 6, Fig. 1 showing a device which is old in the art and Fig. 6 a device embodying the invention.

Referring for that comparison first to Fig. 1, the resistances of a transmitter and/or of a receiver-potentiometer 1, 2 are connected in parallel with a current source 3, whereas their tappings 4 and 5 are connected with each other through a moving-coil measuring instrument 6. A switch 8, which is subject to the influence of the moving coil 7, is connected in the magnet circuits of relays 9, 10, the terminals of which are connected on the one side with the current source 3, whereas, on the other side, opposite-pole terminals are connected to the servomotor 11. The latter drives through a gearing 12 a shaft 14, which leads to the control means 13 and is coupled in a suitable manner with the tapping 5 of the receiver potentiometer. This coupling is indicated in the drawing by a fixed mounting of the tapping 5 on the control shaft 14.

When the tapping 4 of the transmitter potentiometer 1 is adjusted, the indicating means, which is connected in a bridge network, is deflected and operates the switch 8. The latter closes the magnet circuit of one of the two relays 9, 10, depending on the sense in which the indicating means has been deflected. Thereby the servomotor 11 is switched on and adjusts through the gearing 12 the control means 13 and, at the same time, the tapping 5 of the receiver potentiometer until the resistance ratios of the potentiometers 1, 2 are equal and the indicating means 6 becomes currentless. Interrupting the magnet circuit of the energized relay, the switch 8 stops the servomotor 11. Hence the control means 13 is always adjusted in accordance with the adjustment of the transmitter potentiometer.

However as the servomotor 11 is not switched off until the control means has reached its prescribed position, the inertia of the servomotor results in an additional displacement of the tapping 5, whereby the indicating means is deflected in the opposite sense. As a result, the switch 8 closes the magnet circuit of the previously open relay so as to switch on the motor for motion in the opposite sense. Thus the control means fluctuates about its prescribed position for a shorter or longer period of time. By a decrease of the switch-sensitivity and increase of the friction this phenomenon can be compensated at the expense of the accuracy of transmission.

The just mentioned drawbacks can be avoided by the use of a two-part potentiometer as previously described in connection with any one of the Figs. 2, 4 or 5 instead of the simple receiver potentiometer 2 shown in Fig. 1. Each of the two parts A and B of this two-part potentiometer is influenced by a different measurement value, the potential changes in both said parts A and B caused by changes in one or the other or both of said two measurement values being algebraically added to each other. The measurement value influencing the composite part A corresponds to the position of the rotor of the servomotor 11 through the gearing 12 simultaneously with the control means 13 in the same manner as has been described above for the single receiver potentiometer 2 of Fig. 1. As to the single potentiometer forming the part B of the two-part potentiometer of Fig. 2, the measurement value which adjusts this potentiometer is the speed of rotation of the servomotor 11. This speed of rotation exerts its controlling influence upon the position of the tapping 21 through the intermediary of a tachometer. An arrangement of that kind is shown in Fig. 6 in which figure the tappings of the two rheostats of the composite part of the sum potentiometer are denoted by the reference numerals 32 and 33 and the single rheostat of the sum potentiometer and the tapping thereof are respectively denoted as 31 and 30. Those parts of Fig. 6 which are identical with parts of Fig. 1 are denoted by the same reference numerals as in Fig. 1. The servomotor 11 rotates an aluminium box 29, which is surrounded by a spring-held ring magnet 28, whereby eddy currents are induced in the box, which, to an extent which depends on its speed of rotation, moves the ring magnet 28 with the tapping 30 of the resistance 31 out of its position of rest, in which the resistance 31 is divided halfways, and adjusts it in the sense of rotation, against the force of a spring. Thus the measuring values which, additively, influence the potential of the tapping 30 are the position of the regulating motor and the angular velocity of the latter, the potential of the tapping 30 being compared with the potential of the tapping 4. By this adjustment the resistance ratios of the transmitter and receiver potentiometers are equalized already before the control means has reached its prescribed position, whereby the indicating device becomes currentless; the switch 8 switches off the energized relay and the servomotor 11 dies out. As the speed of rotation drops, the tapping 30 returns to its central position of rest, whereby the alteration of the resistance ratios, caused by the further adjustment of the tappings 32, 33 by the dying-out servomotor 11, is compensated, until the prescribed value has been reached, so that the indicating means remains currentless.

The control device according to the invention enables the accurate and sensitive electrical transmission of measurement values and avoids any overcontrol. The invention is not restricted to remote-control devices but may be used wherever several measurement values, which are independent of each other, are to be additively superposed to give a resulting value, in cross-coil indicating devices, direction-control compasses, but also in output controls or the like, as well as in counting and calculating machines. The rheostats of the sum potentiometers may be made, e. g., from resistance material which is sensitive to light or pressure, and the mechanically adjustable tappings may be replaced by light or pressure influences which correspond to the measurement value and to the influence to which the rheostats are subjected.

I claim:

1. In a device for controlling the electric potential of a point of an electric circuit in response to variations of at least two influencing factors by means of variable resistors, an odd number $2n$ of variable resistors of which one resistor is arranged singly and the remaining resistors are arranged in pairs of identical resistors, the number of pairs of resistors being equal to the number $n$ of influencing factors reduced by 1, the two resistors of each of said pairs being mechanically coupled with each other each of said resistors having a tapping movable relative to its coordinated resistor in response to variations of one of said influencing factors so as to vary the effective resistance value of that resistor in accordance with the variations of that influencing factor, the total number of said tappings being thus equal to said odd number $2n+1$, the first pair of resistors being adapted to be connected between a voltage desired to be divided and any following pair or pairs of resistors and said singly arranged resistor being connected between the two tappings of the respective preceding pair, each of the two resistors of each of said pairs having one end electrically separated from one end of the respective other resistor of the same pair, and means for keeping said variations of said effective resistance values of the two resistors of each of said pairs equal but opposite so that for any voltage applied to such a pair the sum of said effective resistance values of said two resistors of that pair remains constant regardless of variations of the individual effective resistance values of said two resistors of that pair.

2. A device as claimed in claim 1, wherein the two tappings of each pair of identical resistors are movable tappings and are mechanically coupled with each other for synchronous motion.

3. A device as claimed in claim 1 wherein the resistors of each pair of resistors have each a tapping which is rotatable over its coordinated resistor and said two rotatable tappings are mounted on a common shaft or on shafts coupled for synchronous motion.

4. A device according to claim 1, having a transmitter- and a receiver-potentiometer and a switching means for a servomotor which simultaneously adjusts the tapping of the receiver potentiometer, said switching means being connected in a bridge network, characterized in that the receiver potentiometer is replaced by three rheostats one of the tappings of which consists of a control means which is influenced by the speed of rotation of the servomotor.

References Cited in the file of this patent

UNITED STATES PATENTS

| Number | Name | Date |
| --- | --- | --- |
| 1,641,491 | Hyland | Sept. 6, 1927 |
| 2,212,760 | Uehling | Aug. 27, 1940 |
| 2,361,790 | Noxon | Oct. 31, 1944 |
| 2,410,651 | Glass | Nov. 5, 1946 |
| 2,432,862 | Coulbourn | Dec. 16, 1947 |
| 2,537,498 | Wickesser | Jan. 9, 1951 |
| 2,584,897 | Marco | Feb. 5, 1952 |
| 2,617,586 | Gray | Nov. 11, 1952 |

OTHER REFERENCES

Gross, "Course Line Computer for Aircraft Radio Navigation," Proceedings I. R. E., July 1949, pp. 830–834.

Publication, "Electronics," Aug. 1946, pp. 110–113.

"Servomechanism Fundamentals," by Lauer, Lesnick, and Matson, McGraw-Hill Book Co., 1947, pp. 100 and 101.